US012347971B2

(12) United States Patent
Makosky et al.

(10) Patent No.: US 12,347,971 B2
(45) Date of Patent: Jul. 1, 2025

(54) ELECTRICAL CONNECTOR

(71) Applicant: DESIGN ENGINEERING MANUFACTURING (DEM), Newbury, OH (US)

(72) Inventors: Justin Makosky, Hiram, OH (US); Craig Padula, Chagrin Falls, OH (US)

(73) Assignee: PADCO INDUSTRIES, LLC, Newbury, OH (US)

( * ) Notice: Subject to any disclaimer, the term of this patent is extended or adjusted under 35 U.S.C. 154(b) by 455 days.

(21) Appl. No.: 18/083,828

(22) Filed: Dec. 19, 2022

(65) Prior Publication Data

US 2024/0204458 A1 Jun. 20, 2024

(51) Int. Cl.

| | |
|---|---|
| ***H01R 13/639*** | (2006.01) |
| ***H01R 13/15*** | (2006.01) |
| ***H01R 13/52*** | (2006.01) |
| ***H01R 13/625*** | (2006.01) |
| ***H01R 13/627*** | (2006.01) |
| ***H01R 13/629*** | (2006.01) |

(52) U.S. Cl.

CPC ........... *H01R 13/639* (2013.01); *H01R 13/15* (2013.01); *H01R 13/5202* (2013.01); *H01R 13/625* (2013.01); *H01R 13/6276* (2013.01); *H01R 13/62905* (2013.01)

(58) Field of Classification Search

CPC ............................ H01R 13/639; H01R 13/625

USPC .......................................................... 439/352

See application file for complete search history.

(56) References Cited

U.S. PATENT DOCUMENTS

| | | | | |
|---|---|---|---|---|
| 9,502,824 | B2 | 11/2016 | Jordan | |
| 2017/0352986 | A1 * | 12/2017 | Leroyer | H01R 13/6275 |

* cited by examiner

*Primary Examiner* — Christopher M Koehler
*Assistant Examiner* — Gregory L Mangot
(74) *Attorney, Agent, or Firm* — Squire Patton Boggs (US) LLP

(57) ABSTRACT

An electrical connection system includes an electrical connector that has a body, a plurality of contact pins received in the body, a tab that is radially movable relative to the body, and a cam mechanism for moving the tab. The electrical connection system further includes a mating connector having a plurality of pin receptacles and at least one key. When the mating connector is inserted in the body of the electrical connector and the plurality of pin receptacles receives a respective one of the plurality of contact pins, the cam mechanism moves the tab to block a path of the key to prevent removal of the mating connector from the electrical connector.

20 Claims, 11 Drawing Sheets

ELECTRICAL CONNECTOR

FIELD OF INVENTION

The present disclosure relates to electrical connections. More particularly, the present disclosure relates to an electrical connector having a locking mechanism.

BACKGROUND

Military personnel, first responders, and other professionals may rely on a headset that connects to a radio or other communications equipment to coordinate efforts with other team members. Known headsets include connectors with a retaining mechanism that allows for quick connection and disconnection of the headset from the communications equipment. Aside from headsets, other known electrical devices use various mechanisms for quick connection and disconnection. While such arrangements may be advantageous in certain applications, they are deficient in that the headset or other electrical device may become inadvertently disconnected. Therefore, it is desired to provide the connector with an arrangement that selectively locks the headset to the communications equipment or otherwise provides a selectively lockable electrical connection.

SUMMARY OF THE INVENTION

In one embodiment, an electrical connection system includes an electrical connector that has a body, a plurality of contact pins received in the body, a tab that is radially movable relative to the body, and a cam mechanism for moving the tab. The electrical connection system further includes a mating connector having a plurality of pin receptacles and at least one key. When the mating connector is inserted in the body of the electrical connector and the plurality of pin receptacles receives a respective one of the plurality of contact pins, the cam mechanism is configured to move the tab to block a path of the key to prevent removal of the mating connector from the electrical connector.

In another embodiment, a method of establishing an electrical connection includes providing an electrical connector and a mating connector. The electrical connector has a body, a plurality of contact pins received in the body, a tab, and a collar for moving the tab. The mating connector includes a plurality of pin receptacles and at least one key. The method further includes advancing the mating connector toward the electrical connector until the plurality of pin receptacles receives a respective one of the plurality of contact pins. The collar is rotated from a first position to a second position to move the tab radially relative to the body to block a path of the key.

In another embodiment, an electrical connector includes a body. The body has retaining walls that define a body track. The body further has a keyway. A tab is received in the body track. A collar is disposed radially outward of the body and is rotatable relative to the body between a first position and a second position. A cam mechanism moves the tab radially inward and outward. The cam mechanism includes pins that extend from the tab into cams slots on the collar. The cam slots engage the pins to move the tab radially inward into the path of the keyway when the collar is rotated from the first position to the second position. The cam slots engage the pins to move the tab radially outward out of the path of the keyway when the collar is rotated from the second position to the first position.

BRIEF DESCRIPTION OF DRAWINGS

In the accompanying drawings, structures are illustrated that, together with the detailed description provided below, describe exemplary embodiments of the claimed invention. Like elements are identified with the same reference numerals. It should be understood that elements shown as a single component may be replaced with multiple components, and elements shown as multiple components may be replaced with a single component. The drawings are not to scale and the proportion of certain elements may be exaggerated for the purpose of illustration.

DETAILED DESCRIPTION

Figure 1:
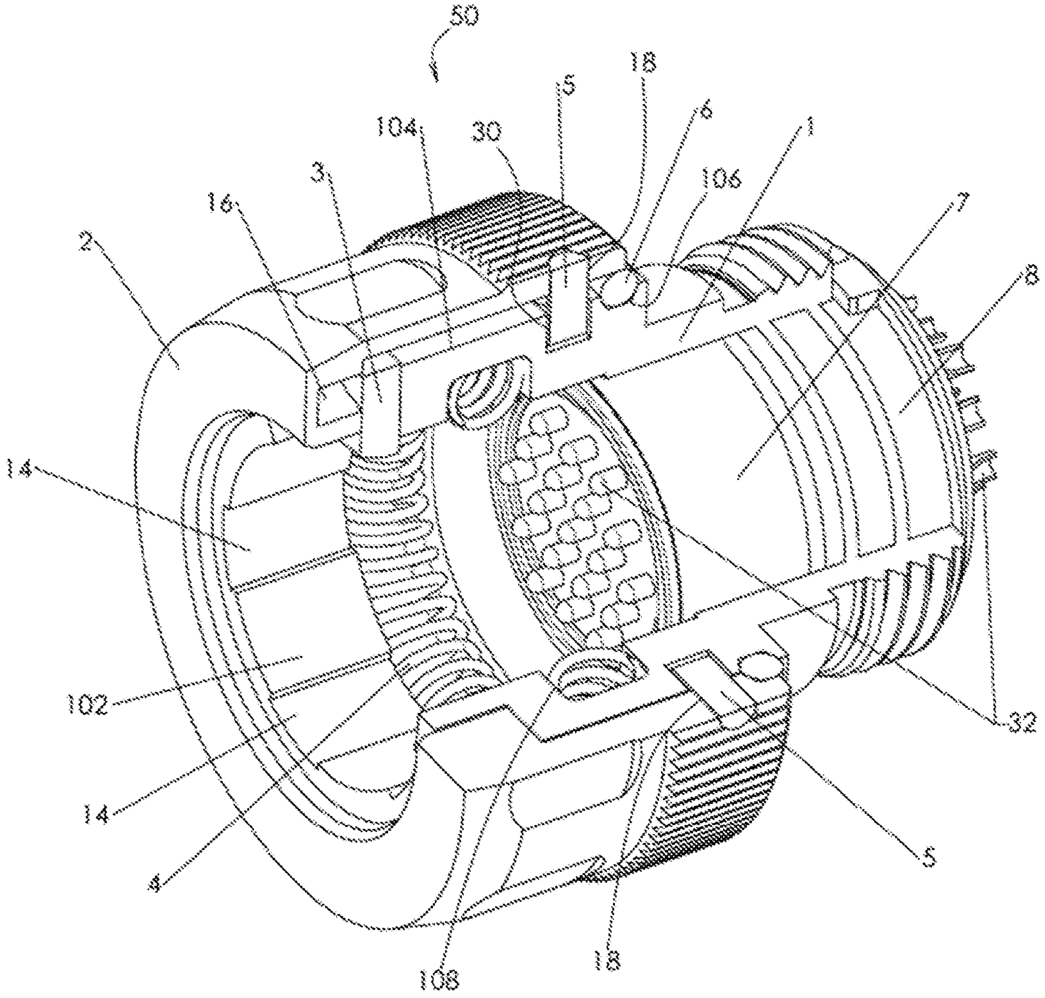
FIG. 1 is a perspective cutaway view of one embodiment of an electrical connector.
Figure 2:
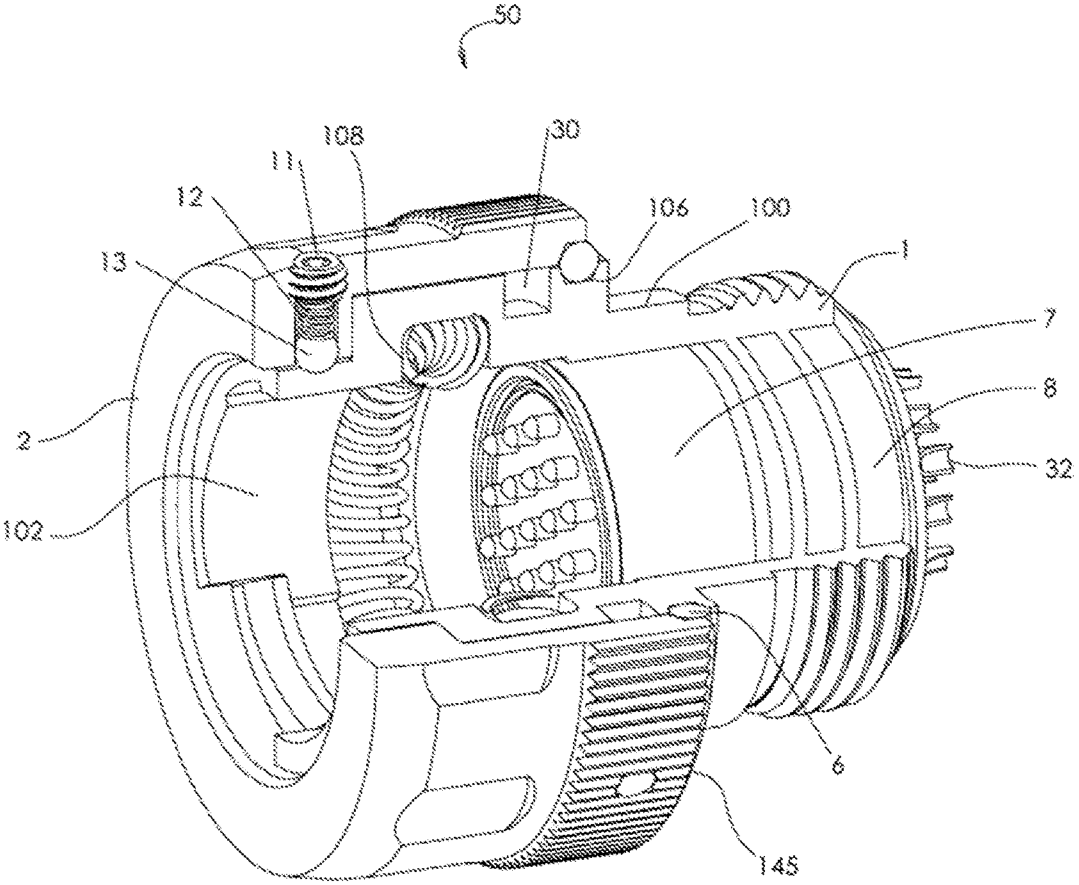
FIG. 2 is another perspective cutaway view of the electrical connector of FIG. 1.
Figure 3:
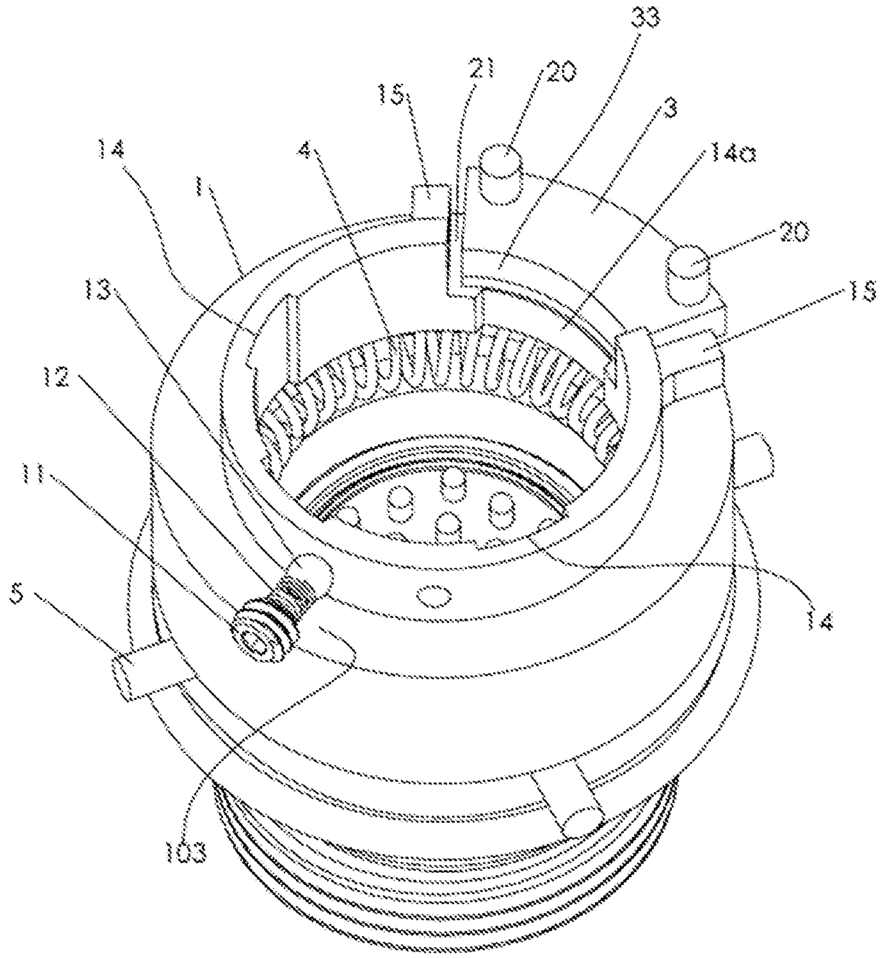
FIG. 3 is a perspective view of a base of the electrical connector of FIG. 1.
Figure 4:
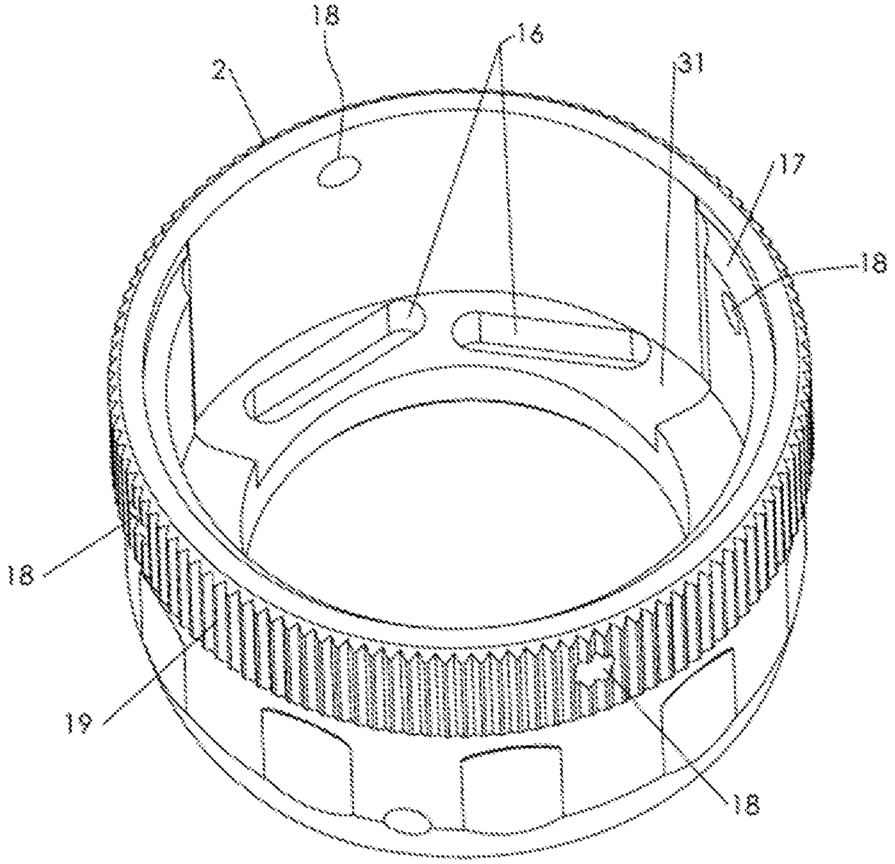
FIG. 4 is a perspective view of a collar of the electrical connector of FIG. 1.

FIGS. 1-6 illustrate one embodiment of an electrical connector 50. According to one example, the electrical connector 50 may be used to connect a headset to communications equipment. The electrical connector 50, however, may be used in any application where a locking electrical connection is desired.

The electrical connector 50 includes a body 1 and a collar 2, and extends along a longitudinal axis between a first end and a second end. The collar 2 is disposed radially outward of the body 1 at the second end of the electrical connector 50. The body 1 includes an internal surface 102 and an external surface 104. The external surface 104 includes a first groove 30 and a second groove 106. The collar 2 is secured to the body 1 by retaining pins 5 that extend through holes 18 in the collar 2 and received by the first groove 30. The second groove 106 receives a resilient O-ring 6 that provides a seal between the external surface 104 of the body 1 and the collar 2. In alternative embodiments, the collar may be secured to the body using any desired arrangement. In other alternative embodiments, the O-ring may be omitted, or other sealing arrangements may be employed.

The collar 2 has a retention mechanism 103 for retaining the rotational position of the collar 2 relative to the body 1 in one of a first position and a second position. The first position corresponds to the electrical connector 50 being in an unlocked state, and the second position corresponds to the electrical connector 50 being in a locked state.

The retention mechanism 103 includes a spring 12 and a ball detent 13. The spring 12 biases the ball detent 13 toward the external surface 104 of the body 1. The external surface 104 of the body 1 has dimples 105, 107 that receive the ball detent 13 to retain the rotational position of the collar 2 relative to the body 1 in a desired position. A set screw 11 engages the spring 12 and can be screwed into or out of the collar 2 to adjust the retention force of the retention mechanism 103. For example, the set screw 11 may be screwed in to make it more difficult to rotate the collar 2 away from one of the first and second positions and screwed out to make it easier to rotate the collar 2 away from one of the first and second positions. In alternative embodiments, the retention mechanism may be any desired arrangement, or the retention mechanism may be omitted. In other alternative embodiments, the external surface of the body may include a greater or fewer number of dimples to retain the rotational position of the collar relative to the body in a greater or fewer number of positions.

The outer surface of the collar 2 may be provided with knurling 19 to promote an operator's grip on the collar 2. In alternative embodiments, the knurling on the collar may be omitted, or the collar may include any desired arrangement for promoting operator grip.

The internal surface 102 of the body 1 defines a channel 100 and includes a plurality of keyways 14 and a third groove 108. The third groove 108 receives a resilient endless spring 4. The plurality of keyways 14 extend parallel with the longitudinal axis of the electrical connector 50. In the illustrated embodiment, the internal surface 102 includes four keyways 14, including one major keyway **14*a*. The major keyway 14*a* has a width that is larger than the width of the remaining keyways 14**. In alternative embodiments, the internal surface may include a greater or fewer number of keyways.

The channel 100 receives a pin block 8 at the second end of the electrical connector 50. The pin block 8 holds contact pins 32 that may be used to electrically connect the electrical connector 50 to a wire end. The contact pins 32 extend parallel with the longitudinal axis of the electrical connector 50. In the illustrated embodiment, the body 1 includes a key 23 that engages with a keyway 24 (see FIG. 7) on the pin block 8 to retain the pin block 8 in the body 1. In alternative embodiments, the pin block may be retained in the body using any desired arrangement.

The channel 100 further receives a pin block seal 7. The contact pins 32 extend through and protrude from the pin block seal 7. The pin block seal 7 cooperates with a mating connector to create an environmental seal for the contact pins 32. In alternative embodiments, the pin block seal may be omitted, or the electrical connector may include any desired arrangement for creating an environmental seal for the contact pins.

A tab 3 is provided to the body 1 at the second end of the electrical connector 50. Retaining walls 15 on the body 1 define a body track 21 that receive the tab 3 and align it with the major keyway **14*a*. A corresponding clearance cut 31 on the collar 2 cooperates with the body track 21 to retain the tab 3**.

A cam mechanism 200 moves the tab 3 in a radial direction (i.e., perpendicular to the longitudinal axis of the electrical connector 50). The cam mechanism 200 includes pins 20 on the tab 3 that extend into cam slots 16 on the collar 2. Each of the cam slots 16 is angled such that a first end of the cam slot 16 is disposed radially outward of a second opposite end of the cam slot 16. In other words, the second end of the cam slot 16 is closer to the longitudinal axis of the electrical connector 50 than the first end of the cam slot 16. The tab 3 includes a chamfered edge 33. The chamfered edge 33 is configured to allow a mating connector to be inserted into the electrical connector 50 regardless of whether the electrical connector 50 is in the unlocked or locked state. In alternative embodiments, the chamfered edge may be omitted.

Figure 5:
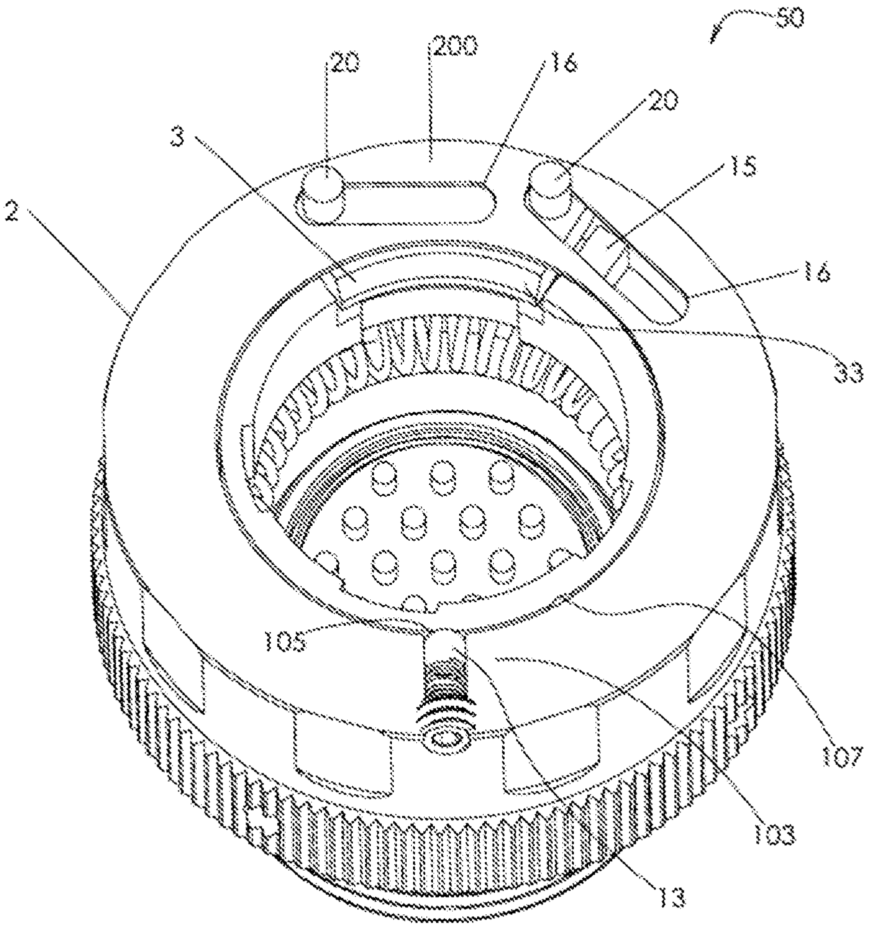
FIG. 5 is a perspective view of the electrical connector of FIG. 1 in an unlocked state.
Figure 6:
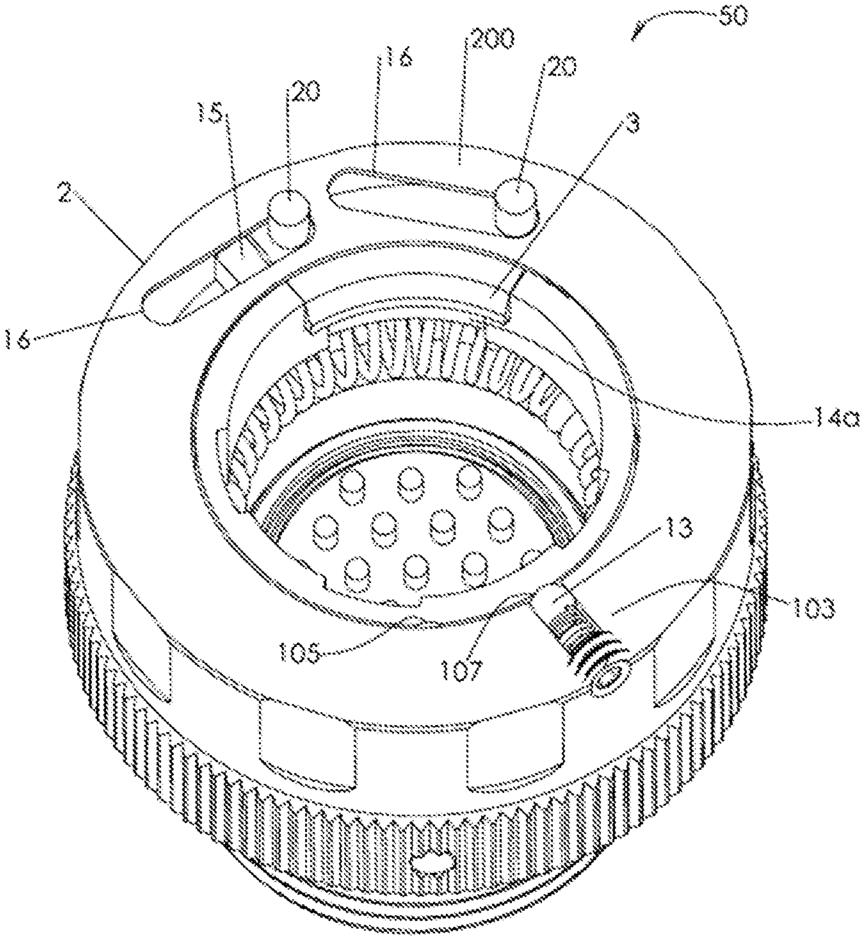
FIG. 6 is a perspective view of the electrical connector of FIG. 1 in a locked state.

The pins 20 are positioned at the first end of the cam slots 16 when the collar 2 is in the first position. When the collar 2 is rotated relative to the body 1 in a first direction from the first position to the second position, the cam slots 16 engage the pins 20 to drive the tab 3 radially inward to block the path of the major keyway **14*a*, thus placing the electrical connector in a "locked" state (FIG. 6). With the collar 2 in the second position, the pins 20 are positioned at the second end of the cam slots 16. When the collar 2 is rotated relative to the body 1 in a second direction opposite the first direction to move the collar 2 from the first position to the second position, the cam slots 16 engage the pins 20 to drive the tab 3 radially outward and out of the path of the major keyway 14*a*, thus placing the electrical connector 50 in an "unlocked" state (FIG. 5). The pins 20 are then again positioned at the first end of the cam slots 16. In addition to capturing the tab 3, the clearance cut 31 provides room to facilitate movement of the tab 3 and thus rotation of the collar 2. As previously discussed, the spring 12 in the collar 2 biases the ball detent 13 into the dimples 105, 107 on the body 1 to retain the electrical connector 50** in a respective one of the locked and unlocked states.

FIGS. 7-10 show the process of locking a mating connector 28 with the electrical connector 50. The mating connector 28 extends along a longitudinal axis between a first end and a second end. The second end includes a plurality of pin receptacles (not shown). The location and spacing of the pin receptacles correspond to the location and spacing of the contact pins 32 on the body 1. A piston portion 111 of the mating connector 28 includes a plurality of keys 25, including one major key **25*a*. The major key 25*a* has a width that is larger than the width of the remaining keys 25. The locating and spacing of the keys 25 correspond to the location and the spacing of the keyways 14 on the body 1. A mating groove 29 is provided adjacent the keys 25** toward the second end.

Figure 7:
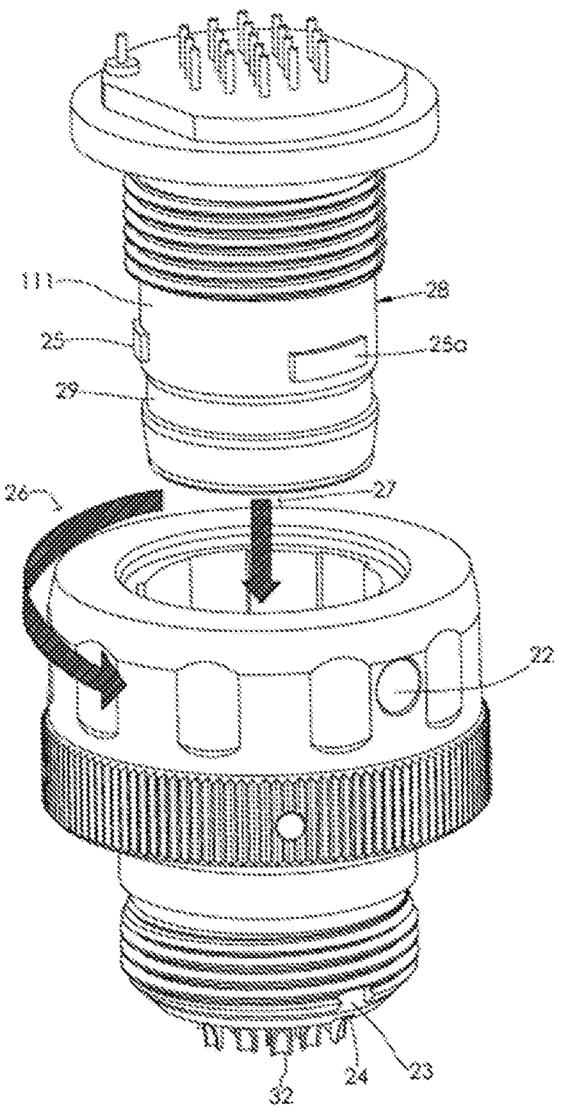
FIG. 7 is a perspective view of a mating connector aligned with and spaced from the electrical connector of FIG. 1, the electrical connector being in the unlocked state.
Figure 9:
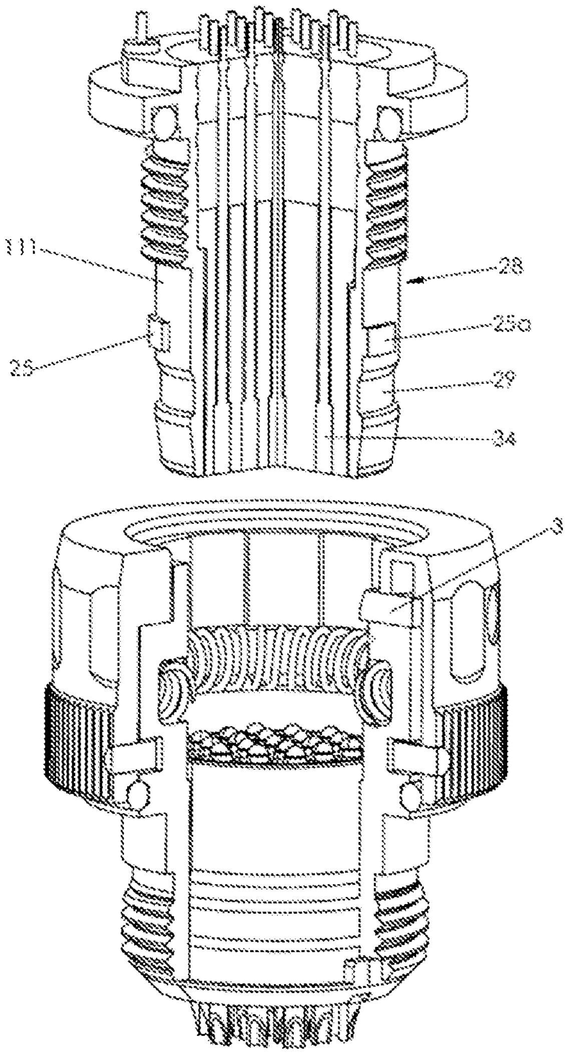
FIG. 9 is a sectional view showing the mating connector aligned with and spaced from the electrical connector of FIG. 1, the electrical connector being in the unlocked state.
Figure 10:
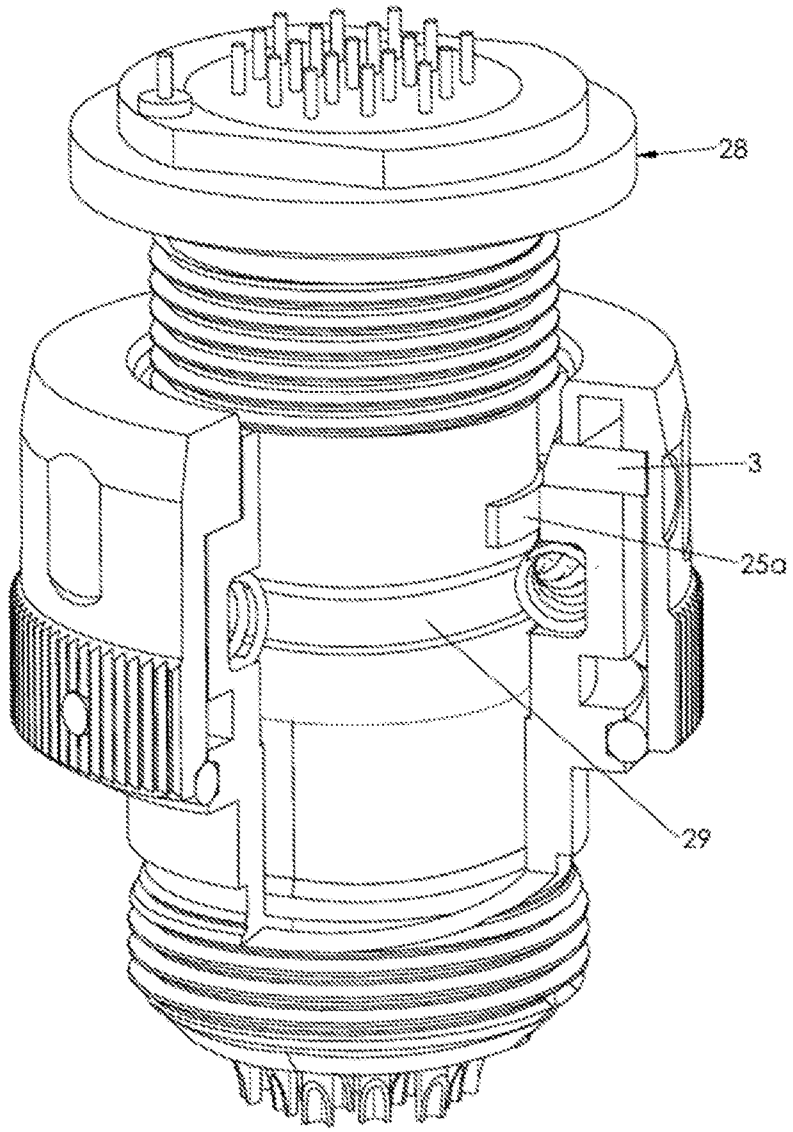
FIG. 10 is a further view showing the mating connector of FIG. 9 engaged with the electrical connector when the electrical connector is in the unlocked state.

The process of locking the mating connector 28 with the electrical connector 50 begins by aligning the major key **25*a* with the major keyway 14*a* (FIGS. 7 and 9). The electrical connector 50 may optionally be provided with an indicator dot 22 or other indicia that is axially aligned with the major keyway 14*a* to facilitate the alignment process. While maintaining this alignment, the second end of the mating connector 28 is advanced toward the second end of the electrical connector 50 until the channel 100 of the body 1 receives the piston portion 111 and the keys 25 engage with a respective one of the keyways 14. The keys 25 and the keyways 14 cooperate to prevent relative rotation between the mating connector 28 and the electrical connector 50 and ensure proper alignment between the contact pins 32** and the pin receptacles.

The mating connector 28 is advanced further into the channel 100 until the piston portion 111 contacts the endless spring 4. The endless spring 4 exerts a force on the piston portion 111 that resists further advancement of the mating connector 28. An operator may exert additional force on the mating connector 28, thereby causing the piston portion 111 to deform the endless spring 4 radially outward to allow the mating connector 28 further into the channel 100 until the pin receptacles receive the contact pins 32. This results in the mating connector 28 being in the fully inserted position (FIG. 9).

In the fully inserted position, the second end of the mating connector 28 is engaged with the pin block 8, thereby creating an environmental seal for the contact pins 35. Additionally, the mating groove 29 on the mating connector 28 and the endless spring 4 of the electrical connector 50 are axially aligned, thereby allowing the endless spring 4 to expand into the mating groove 29 to provide an unlocked (i.e., releasable) connection. The unlocked connection provides some level of retaining force to maintain the connection between the mating connector 28 and the electrical connector 50, but still allows for removal of the mating connector 28.

Figure 8:
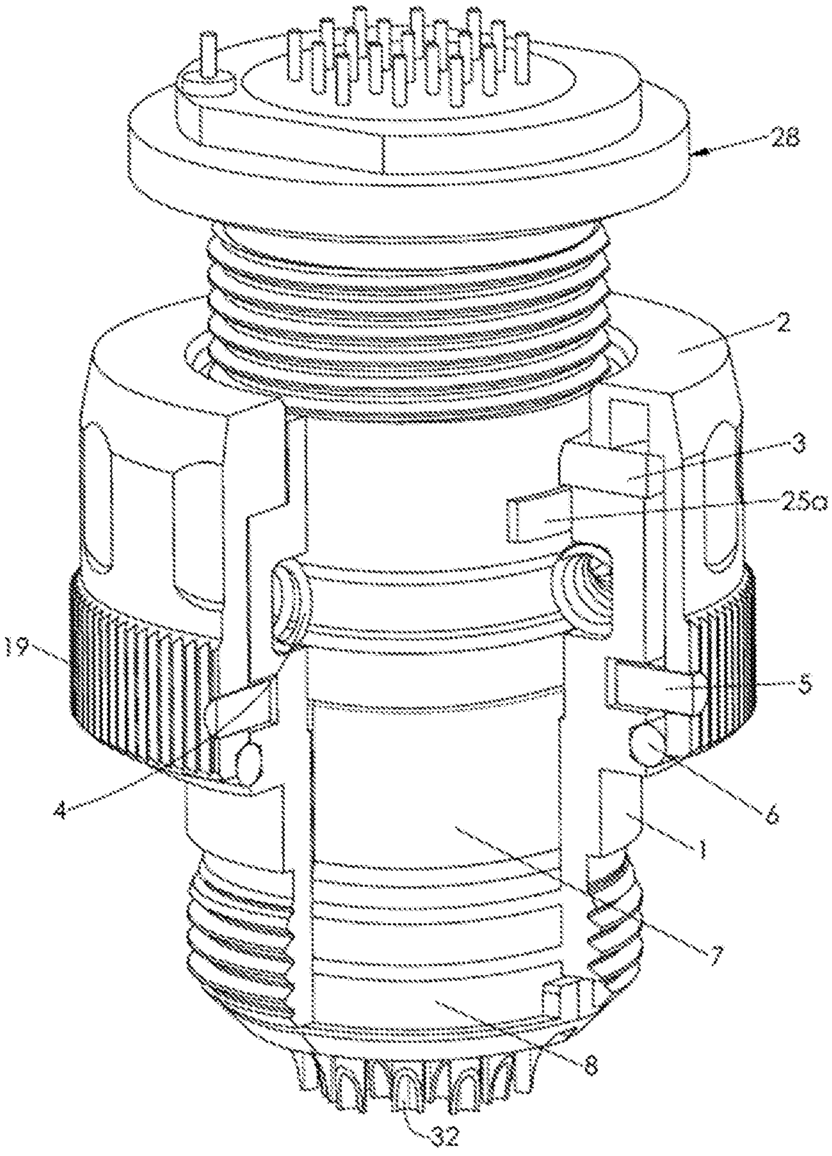
FIG. 8 is a further view showing the mating connector of FIG. 7 fully inserted into the electrical connector, with the electrical connector in the locked state.
Figure 11:
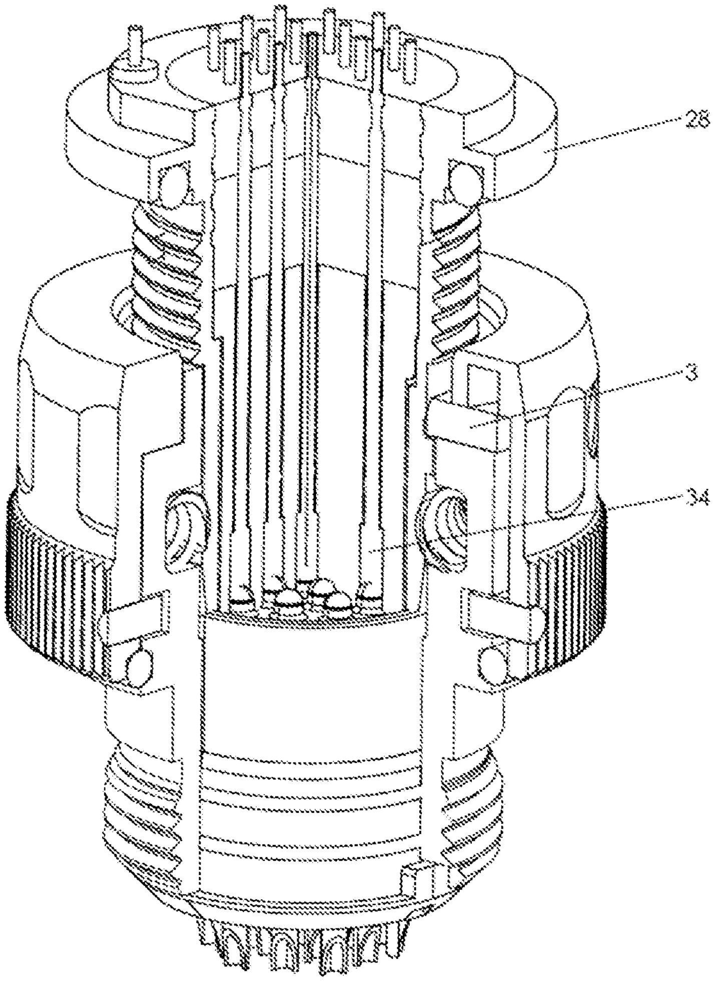
FIG. 11 is a further view of FIG. 10 showing the mating connector engaged with the electrical connector when the electrical connector is in the locked state.

An operator may manipulate the collar 2 to place the electrical connector 50 in a locked state and create a locked connection. To create the locked connection, the operator rotates the collar 2 relative to the body 1 from the first position to the second position to move the tab 3 radially inward. In the fully inserted position, the major key 25*a* is moved axially beyond the tab 3. Thus, the radially inward movement of the tab 3 traps the major key 25*a* by blocking the major keyway 14*a*. Axial movement the major key 25*a* is thereby prevented, and the mating connector 28 is locked to the electrical connector 50 (FIGS. 8 and 11).

The endless spring 4 allows limited relative movement between the mating connector 28 and the body 1 in a direction extending transverse to the longitudinal axis of the electrical connector 50, and the O-ring 6 allows limited relative movement between the collar 2 and the body 1 in the same transverse direction. This relative movement, in combination with the arrangement of the cam mechanism 200, biases the collar 2 toward the second position once an operator has placed the electrical connector 50 in the locked state. Specifically, as the collar 2 is rotated toward, but before reaching, the second position, the tab 3 engages the piston portion 111. Further rotation of the collar 2 requires an operator to apply a slightly higher level of force in order to deform the endless spring 4 and O-ring 6 to cause the above-described relative movement between the mating connector 28, the body 1, and the collar 2. This relative movement allows the collar 2 to complete rotation to the second position. When the collar 2 is in the second position, the tab 3 is moved slightly radially outward, but is still positioned in the path of the major keyway 14*a* to prevent axial movement the major key 25*a*.

Additionally, the relative lateral movement between the mating connector 28, the body 1, and the collar 2 provided by the resiliency of the endless spring 4 and the O-ring 6, in combination with the chamfered edge 33 on the tab 3, allows the mating connector 28 to be moved to the fully inserted position even when the electrical connector 50 is in the locked state. Specifically, when the connector 50 is in the locked state and the tab 3 is blocking the major keyway 14*a*, the piston portion 111 may engage the chamfered edge 33 of the tab 3 and, upon the application of a certain level of force, cause the mating connector 28, the body 1, and the collar 2 to move laterally relative to one another to create enough clearance to allow the major key 25*a* to pass under the tab 3 and along the major keyway 14*a* so that the mating connector 28 can reach the fully inserted position. The orientation of the chamfered edge 33 is such that removal of the mating connector 28 when the electrical connector 50 is in the locked state will not cause the aforementioned lateral movement. In other words, it is not possible to remove the mating connector 28 when the electrical connector 50 is in the locked state.

When an operator desires to disconnect the locking mating connector 28 and the electrical connector 50, the operator may rotate the collar 2 relative to the body 1 to move the collar 2 from the second position to the first position to move the tab 3 radially outward. This removes the tab 3 from the path of the major keyway 14*a*, thus releasing the major key 25*a* and allowing removal of the locking mating connector 28. As discussed above, the collar 2 is biased toward the second position due to the lateral movement of the mating connector 28, the body 1, and the collar 2 and the resiliency of the endless spring 4 and the O-ring 6. Accordingly, an operator will have to apply a certain level of force to overcome this bias to move the collar 2 to the first position. Additionally, as discussed above, the operator will also have to apply a certain level of force to overcome the retaining force provided by the endless spring 4 during removal of the mating connector 28 from the electrical connector 50.

To the extent that the term "includes" or "including" is used in the specification or the claims, it is intended to be inclusive in a manner similar to the term "comprising" as that term is interpreted when employed as a transitional word in a claim. Furthermore, to the extent that the term "or" is employed (e.g., A or B) it is intended to mean "A or B or both." When the applicants intend to indicate "only A or B but not both" then the term "only A or B but not both" will be employed. Thus, use of the term "or" herein is the inclusive, and not the exclusive use. See, Bryan A. Garner, A Dictionary of Modern Legal Usage 624 (2d. Ed. 1995). Also, to the extent that the terms "in" or "into" are used in the specification or the claims, it is intended to additionally mean "on" or "onto." Furthermore, to the extent the term "connect" is used in the specification or claims, it is intended to mean not only "directly connected to," but also "indirectly connected to" such as connected through another component or components.

While the present application has been illustrated by the description of embodiments thereof, and while the embodiments have been described in considerable detail, it is not the intention of the applicants to restrict or in any way limit the scope of the appended claims to such detail. Additional advantages and modifications will readily appear to those skilled in the art. Therefore, the application, in its broader aspects, is not limited to the specific details, the representative apparatus and method, and illustrative examples shown and described. Accordingly, departures may be made from such details without departing from the spirit or scope of the applicant's general inventive concept.

What is claimed is:

1. An electrical connection system comprising:

an electrical connector comprising:

a body;

a plurality of contact pins received in the body;

a tab that is radially movable relative to the body; and a cam mechanism for moving the tab;

a mating connector comprising:

a plurality of pin receptacles; and at least one key;

wherein, when the mating connector is inserted in the body of the electrical connector and the plurality of pin receptacles receives a respective one of the plurality of contact pins, the cam mechanism is configured to move the tab to block a path of the key to prevent removal of the mating connector from the electrical connector.

2. The electrical connection system according to claim 1, further comprising a collar disposed radially outward of the body, the collar being rotatable relative to the body to radially move the tab relative to the body.

3. The electrical connection system according to claim 2, wherein the cam mechanism includes at least one pin, and wherein the collar includes at least one slot for receiving the at least one pin.

4. The electrical connection system according to claim 2, wherein the body includes a groove, the groove receiving retaining pins that extend through the collar to secure the collar to the body.

5. The electrical connection system according to claim 2, wherein the collar includes a retention mechanism that retains a rotational position of the collar relative to the body.

6. The electrical connection system according to claim 5, wherein the retention mechanism includes a spring and a ball detent, the spring biasing the ball detent into dimples on the body to retain the rotational position of the collar relative to the body.

7. The electrical connection system according to claim 1, wherein the tab includes a chamfered edge, the chamfered edge being configured to allow the insertion of the mating connector into the body of the electrical connector when the tab blocks the path of the key.

8. The electrical connection system according to claim 1, wherein the body includes at least one keyway that extends parallel with a longitudinal axis of the electrical connector, the at least one keyway receiving the at least one key when the mating connector is inserted in the body of the electrical connector.

9. The electrical connection system according to claim 8, wherein the body includes a plurality of keyways including a major keyway having a width that is larger than a width of the remainder of the plurality of keyways, and wherein the mating connector includes a plurality of keys including a major key having a width that is larger than a width of the remainder of the plurality of keys, the major keyway receiving the major key when the mating connector is inserted in the body of the electrical connector.

10. The electrical connection system according to claim 1 further comprising a seal, the seal being configured to provide a seal between the body and the collar.

11. A method of establishing an electrical connection comprising:

providing an electrical connector and a mating connector, the electrical connector including a body, a plurality of contact pins received in the body, a tab, and a collar for moving the tab, the mating connector including a plurality of pin receptacles and at least one key advancing the mating connector toward the electrical connector until the plurality of pin receptacles receives a respective one of the plurality of contact pins; and rotating the collar from a first position to a second position to move the tab radially relative to the body to block a path of the key.

12. The method of establishing an electrical connection according to claim 11, wherein the body includes at least one keyway that extends parallel with a longitudinal axis of the electrical connector, the method further comprising the step of aligning the at least one key with the at least one keyway before the step of advancing the mating connector toward the electrical connector.

13. The method of establishing an electrical connection according to claim 12, wherein the body includes a plurality of keyways including a major keyway having a width that is larger than a width of the remainder of the plurality of keyways, and wherein the mating connector includes a plurality of keys including a major key having a width that is larger than a width of the remainder of the plurality of keys, and wherein the step of aligning the at least one key with the at least one keyway includes aligning the major key with the major keyway.

14. The method of establishing an electrical connection according to claim 11, wherein the tab includes at least one pin that is received in at least one slot provided on the collar.

15. The method of establishing an electrical connection according to claim 11, wherein the collar includes a retention mechanism that retains the collar in one of the first position and the second position.

16. An electrical connector comprising:

a body, the body including retaining walls that define a body track, the body further including a keyway;

a tab received in the body track;

a collar disposed radially outward of the body and being rotatable relative to the body between a first position and a second position; and a cam mechanism for moving the tab radially inward and outward, the cam mechanism including pins that extend from the tab into cams slots provided on the collar, wherein the cam slots engage the pins to move the tab radially inward into the path of the keyway when the collar is rotated from the first position to the second position, and wherein the cam slots engage the pins to move the tab radially outward out of the path of the keyway when the collar is rotated from the second position to the first position.

17. The electrical connector according to claim 16, wherein the body includes a plurality of keyways including a major keyway having a width that is larger than a width of the remainder of the plurality of keyways.

18. The electrical connector according to claim 16, wherein the tab includes a chamfered edge.

19. The electrical connector according to claim 16, wherein the collar includes a retention mechanism that retains the body in one of the first position and the second position, the retention mechanism including a spring and a ball detent, the spring biasing the ball detent into dimples on the body.

20. The electrical connector according to claim 16 further comprising a seal, the seal being configured to provide a seal between the body and the collar.

* * * * *